UNITED STATES PATENT OFFICE.

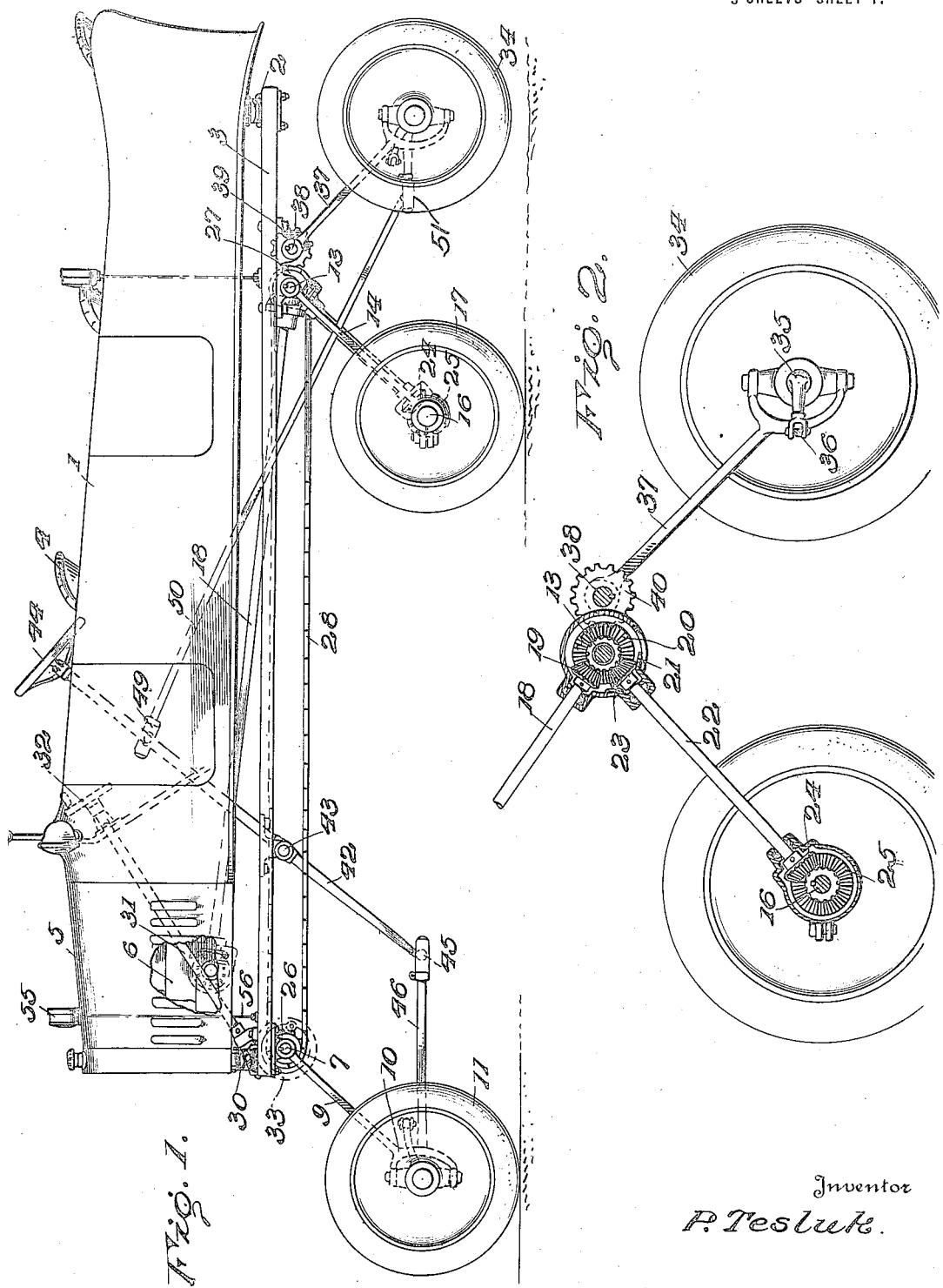

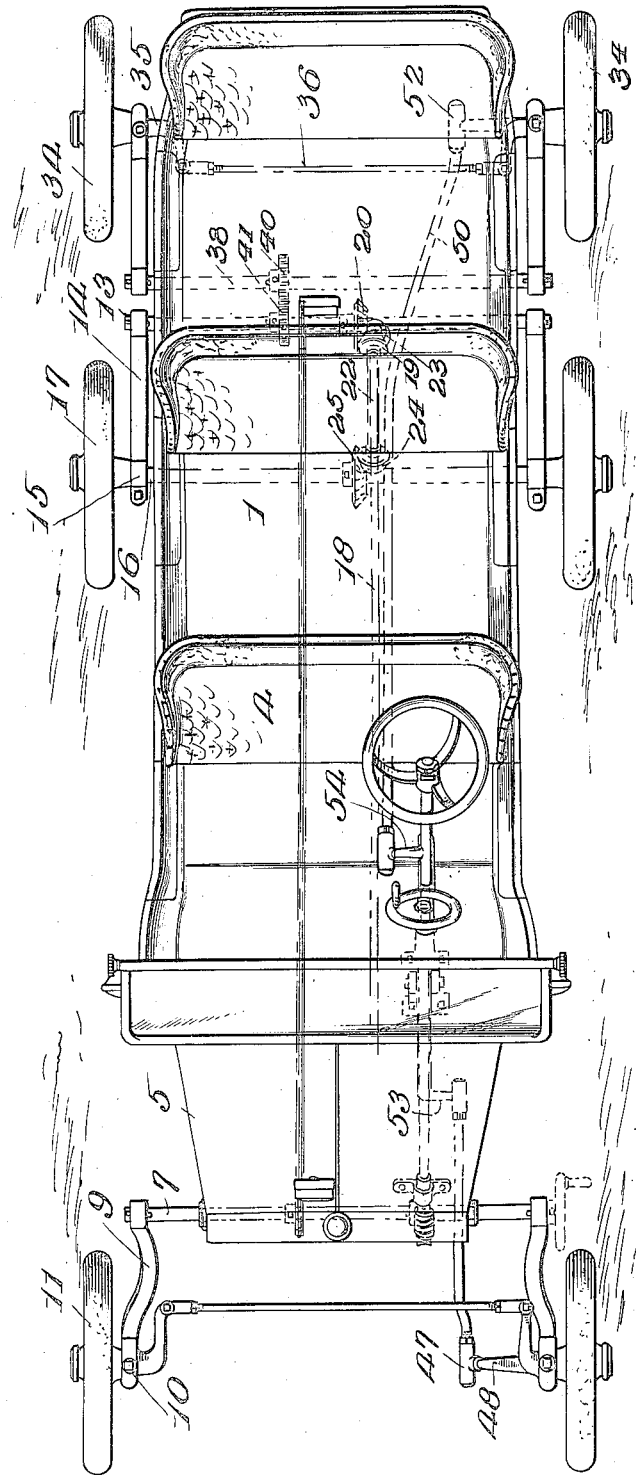

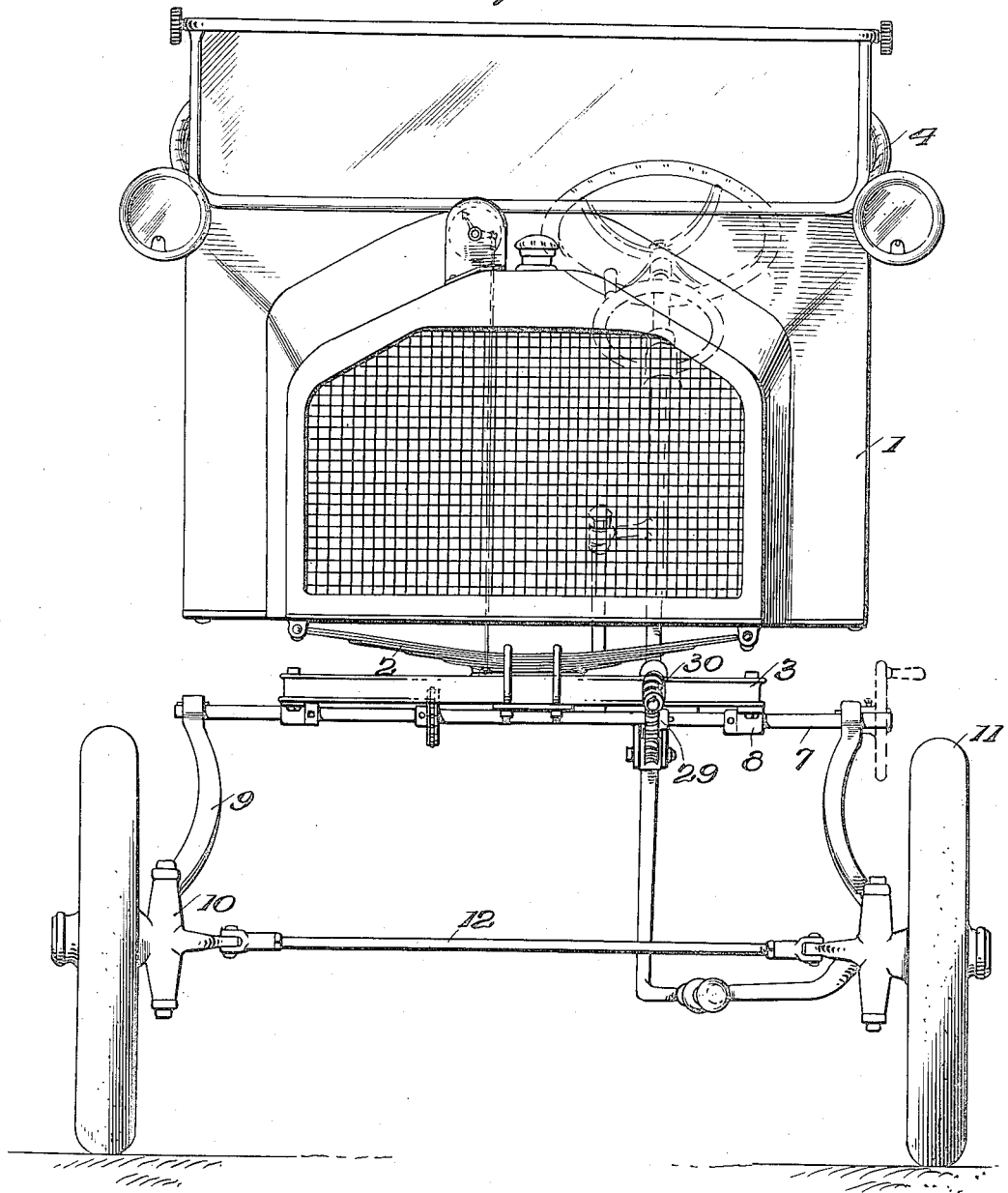

PAMPHIL TESLUK, OF NEW YORK, N. Y.

PROPELLING MECHANISM FOR VEHICLES AND THE LIKE.

1,281,707.  Specification of Letters Patent.  Patented Oct. 15, 1918.

Application filed January 25, 1918.  Serial No. 213,744.

*To all whom it may concern:*

Be it known that I, PAMPHIL TESLUK, a citizen of the United States, residing at New York, in the county of New York and State of New York, have invented certain new and useful Improvements in Propelling Mechanism for Vehicles and the like, of which the following is a specification.

This invention relates to propelling mechanism designed primarily for use in connection with automobiles and similar vehicles. However, as will be apparent from the description which is to follow, the principles of the invention may find embodiment in automobile trucks, manually propelled vehicles, locomotives, street railway cars, and various types of cars or vehicles designed for travel upon tracks, and the use of the invention may be even extended to a stationary power generating plant. Therefore it will be understood that the application of the invention illustrated in the drawings is intended to show merely one adaptation of the principles of the invention and that I am not to be limited to the specific use of the invention illustrated and consequently where in the following description the word vehicle is employed I intend this term to include any of the various means for travel above recited.

In the present invention I contemplate so arranging the front and rear supporting wheels of a vehicle beneath the body thereof that substantially the entire weight of the vehicle body and the load carried thereby will be borne by the rear wheels. Briefly stated the invention contemplates mounting the rear axle of the vehicle at the lower ends of arms which are inclined downwardly and forwardly beneath the body of the vehicle and which at their upper ends are connected to the said body at such a point that substantially the entire weight of the body will be located above the rear axle, the forward wheels being similarly mounted at the lower ends of arms which extend downwardly and forwardly beyond the forward end of the said body. By reason of this arrangement inasmuch as the forward wheels are relieved of any considerable weight, these wheels may be utilized almost solely for the purpose of steering the vehicle.

The invention also contemplates the provision of auxiliary wheels located rearwardly of the said rear axle and designed to prevent backward overturning of the body in the event that such weight is imposed upon the rear portion of the body as to tend to overbalance the body in a rearward direction, there being means provided for angularly adjusting these wheels in unison with the forward wheels so that the vehicle may be steered or guided in its travel even though the forward wheels be out of contact with the road surface.

From the foregoing it will be apparent that the invention aims in general to provide a propelling mechanism for vehicles or the like which will permit of operation of the vehicle with the consumption of minimum power, which will provide for an increased tractive force applied through the driven wheels of the vehicle, and which will permit of more ready steering of the vehicle in its travel.

In the accompanying drawings:

Figure 1 is a side elevation of the mechanism of the present invention embodied in the construction of an automobile.

Fig. 2 is a view partly in vertical front to rear section and partly in elevation illustrating a portion of the power transmission mechanism and also the means provided for angularly adjusting the supporting arms for the auxiliary wheels in unison with the adjustment of the supporting arms for the rear wheels;

Fig. 3 is a top plan view of the mechanism, the body of the vehicle being shown in light lines;

Fig. 4 is a front elevation of the mechanism.

In the drawings, the numeral 1 indicates in general the vehicle body which body may, of course, be of any desired design and construction, and this body is supported by means of bowed springs 2, of the usual type, upon and above a bed frame which is indicated by the numeral 3 and which frame also may be of any desired construction. In the present instance, as before explained, the invention is illustrated as embodied in the construction of an automobile, and in the drawings the numeral 4 indicates the driver's seat, the numeral 5 indicates the engine hood, and the numeral 6 indicates the engine which is located within the hood and which will be further referred to in the description which is to follow.

As before stated, the mechanism of the present invention includes front wheels, rear wheels, and auxiliary wheels, and in each instance these wheels are supported at the lower ends of arms which are fixed at their upper ends to shafts mounted upon the frame 3. The shaft which supports the arms for the front wheels is indicated by the numeral 7 and the said shaft is mounted for rotation in suitable bearings 8 fixed upon the under side of the frame 3. The arms for supporting the forward wheels are indicated by the numeral 9, and these arms are secured rigidly in any suitable manner at their upper ends to the ends of the shaft 7 and extend downwardly and forwardly therefrom, and inasmuch as the said shaft 7 is located at the extreme forward end of the frame 3, the arms 9 will, of course, extend downwardly and forwardly beyond the forward end of the hood 5. Each arm at its lower end is connected to a steering knuckle 10, upon the spindle of which is mounted one of the front wheels indicated by the numeral 11, these knuckles being connected by the usual distance rod 12 so as to provide for their movement in unison in causing corresponding angular adjustment of the wheels in steering the vehicle. The means provided for steering the vehicle will presently be specifically described.

The numeral 13 indicates a shaft which is also mounted in suitable bearings upon the under side of the frame 3, and rigidly secured to this shaft at their upper ends are arms 14 which arms extend downwardly and forwardly and are provided with suitable means 15 connecting them to an axle 16 upon which axle are mounted the rear wheels indicated by the numeral 17. The shaft 13 is located near the rear end of the frame 3 and consequently near the rear end of the body 1 of the vehicle, and the arms 14 are as stated inclined downwardly and forwardly from the said shaft and beneath the said frame 3, the angle of inclination of these arms corresponding to that of the arms 9. At this point it will be apparent that due to the downward and forward inclination of the arms 9 and 14, which results in the wheels 11 being positioned forwardly of the body of the vehicle and the wheels 17 a considerable distance forwardly of the rear end of the vehicle and in fact near the center thereof, substantially the entire weight of the vehicle body and the load carried thereby will be sustained by the rear wheels 17. In order to provide for positive drive of the vehicle, a power transmission shaft 18 is geared at its forward end with the engine 6 and is driven thereby and at its rear end this shaft is provided with a bevel gear 19 which meshes with a similar gear 20 loosely mounted upon the shaft 13 and preferably inclosed within a casing 21. A shaft 22 is suitably supported between the arms 14 and has fixed to its upper end a bevel gear 23 which also meshes with the gear 20 and at its lower end the shaft 22 carries a bevel gear 24 which constitutes an element of a system of differential gearing indicated in general by the numeral 25 and operatively connected with the axle 16. Of course, when the arms 14 are angularly adjusted through the rotary adjustment of the shaft 13, the shaft 22 will be moved with the arms and consequently there will be no interference with the transmission of power from the engine 6 to the differential gearing 25.

In order that the shafts 7 and 13 may be partly rotated so as to vary the angle of inclination of the arms 9 and 14 and consequently adjust the wheels 11 and 17 so that if it is found that the load is not properly distributed between the said wheels, this may be remedied, sprocket gears 26 and 27 are fixed respectively upon the shafts 7 and 13, and a sprocket chain 28 is trained about these gears. A worm gear 29 is fixed upon the shaft 7, and a worm 30 meshes with this gear and is fixed at the lower end of a rotary shaft 31 which extends up through the hood 5 and has its upper end located in front of the driver's seat 4 and provided with a hand wheel 32 whereby it may be rotated so as to cause co-action of the worm 30 with the worm gear 29 to rotatably adjust the shaft 7. Such adjustment of the shaft 7 will cause corresponding adjustment of the shaft 13 and therefore the arms 9 and 14 may be caused to assume a more nearly vertical position than illustrated in Fig. 1, or a more nearly horizontal position, depending upon load conditions. Naturally the greater portion of the weight of the vehicle and the load carried thereby will, under normal conditions, be located rearwardly of the center of the vehicle and consequently the farther forward the wheels 17 are adjusted, the less will be the weight imposed upon the forward wheels 11. Therefore, the operator of the machine will rotate the hand wheel 32 to so angularly adjust the arms 9 and 14 that substantially the entire weight of the vehicle and the load carried thereby will be imposed upon the rear wheels 17. The hand wheel 32 may be, of course, operated without leaving the machine, but if desired this hand wheel and the shaft 31 may be dispensed with and a hand wheel, shown in dotted lines in the drawings, and indicated by the numeral 33, may be fixed upon one end of the shaft 7 for the purpose of adjusting this shaft and consequently the shaft 13.

Ordinarily the operator of the machine will so adjust the shafts 7 and 13 that the vehicle as a whole will be substantially balanced upon the rear wheels 17. It is therefore essential that means be provided for preventing overturning of the machine in a rearward direction, and this means consists of auxiliary wheels 34 which are mounted upon the spindles of steering knuckles 35 connected by usual distance rod 36. The steering knuckles 35 are supported at the lower ends of arms 37 which arms at their upper ends are secured to a shaft 38 mounted at suitable bearings 39 upon the under side of the frame 3. Normally the wheels 34 are to be spaced a short distance above the road surface as clearly shown in Fig. 1 of the drawings. However, it is obvious that if the arms 9 and 14 are adjusted to extend more nearly horizontal than shown in Fig. 1 of the drawings, the vehicle body will be lowered to a greater or less extent and on the other hand if the arms are adjusted to assume a more nearly vertical position, the vehicle body will be elevated to a greater or less extent. Consequently it is essential that means be provided for automatically adjusting the wheels 34 so that they will at all times maintain the same position of elevation above the road surface regardless of the adjustments of the said arms 9 and 14. In order that this may be accomplished, a gear 40 is fixed upon the shaft 38 and meshes with a similar gear 41 fixed upon the shaft 13. Therefore when the shaft 13 is rotatably adjusted so as to angularly adjust the arms 14, the arms 37 will be correspondingly adjusted but in an opposite direction; that is to say when the arms 14 are swung to approach the vertical, the arms 37 will be correspondingly swung and when the arms 14 are adjusted to approach the horizontal, the said arms 37 will be correspondingly moved, the arms 14 and 37 approaching each other in the first instance and moving away from each other in the latter instance.

As above stated the wheels 34 are mounted upon the spindles of steering knuckles and this is done in order that the said wheels 34 may serve as means for steering the vehicle in the event that the vehicle is overbalanced in a rearward direction and the front wheels 11 therefore leave the road surface. It is, of course, essential therefore that means be provided for angularly adjusting the auxiliary wheels 34 simultaneously with the angular adjustment of the wheels 11 and this is accomplished in a manner which will now be explained. The numeral 42 indicates a steering post which is rotatably mounted in a suitable bearing 43 of such construction that the post 42 may have swinging movement in a vertical plane in a front to rear direction. Above the bearing 43 the steering post extends up into the body of the vehicle with its operating wheel 44 located in front of the driver's seat 4 and the portion of the post below the bearing 43 extends in alinement with the said upper portion of the post. Connected by means of a universal joint 45 with the lower end of the post 42 is a rod 46 which is connected by a similar joint 47 with an arm 48 upon one of the steering knuckles 10. Connected by a universal joint 49 with the upper portion of the steering post 42 at a point above the bearing 43 and which point is spaced from the bearing a distance equal to the distance between the bearing and the joint 45, is a rod 50, which rod extends rearwardly and downwardly and is connected by a universal joint 51 to an arm 52 upon the corresponding one of the steering knuckles 35. The steering post 42 is, as stated, supported for free front to rear swinging movement and this post at all times maintains a position parallel to the arms 9 and 14. As a consequence angular adjustment of the arms 9 and 14 does not in any way disturb or interfere with the operation of the steering mechanism. The joints 45 and 49 are, as will be apparent by reference to Figs. 3 and 4 of the drawings, located at the outer ends of arms 53 and 54 respectively. As concerns the swinging movement of the steering post 42 to permit of adjustment of the arms 9 and 14, it may be stated that the arms 48 and 52 are of the same length as are also the arms 53 and 54, and consequently when the lower ends of the arms 9 are moved forwardly for example, in the angular adjustment of these arms and the arms 14, the lower end of the steering post 42 will be carried forwardly, and inasmuch as the arm 54 is located above the bearing 43 a distance corresponding to the distance between this bearing and the arm 53, and further inasmuch as the arms 37 are swung rearwardly, under such conditions, the same distance as that to which the arms 9 are swung forwardly, no turning motion will be imparted to the arms 52 by reason of the swinging movement of the steering post.

As the operator of the machine may be frequently required to adjust the arms 9 and 14 so as to properly distribute the weight of the vehicle and the load carried thereby, I have found it desirable to provide one or more indicating devices upon the vehicle, and each of these devices preferably consists of a suitable indicator mechanism 55 designed to be actuated through the up and down movement of a rod 56, the mechanism itself being mounted upon the vehicle body, as for example upon the hood 5 or in front of one of the rear seats, and the rod 56 being secured at its lower end to the frame 3. By reason of this arrangement, assuming that one of the indicators is located at the forward end of the vehicle and the other at the rear end thereof, when the said ends of the vehicle move downwardly with relation to the frame 3 and against the tension of the front and rear springs 2, and under the influence of the load, the said indicators will indicate respectively the number of pounds imposed upon the forward and rear ends of the vehicle body, and thus the operator may be guided in making the necessary adjustments of the arms 9 and 14.

Having thus described the invention, what is claimed as new is:

1. In mechanism of the class described, a load supporting body, front spindles and a rear axle, and members supporting the said body above and upon the spindles and axle, the said members extending downwardly and forwardly in inclined position, and the member for connecting the rear axle to the body being connected with the said body at such a point that substantially the entire weight of the body will be sustained by the rear spindles and axle, and wheels upon the axles.

2. In a mechanism of the class described, a load supporting body, front spindles and a rear axle, and members supporting the said body above and upon the spindles and axle, the said members extending downwardly and forwardly in inclined position, and the member for connecting the rear axle to the body being connected with the said body at such a point that substantially the entire weight of the body will be sustained by the rear axle, wheels upon the spindles and axle, the member for the forward spindles being connected with the body substantially at the front thereof, and means for steering the said spindles.

3. In mechanism of the class described, a load supporting body, front spindles and a rear axle, and members connecting the said spindles and axle with the body, the said members extending downwardly and forwardly in inclined position, and the member for connecting the rear axle to the body being connected with the said body at such a point that substantially the entire weight of the body will be sustained by the rear axle, wheels upon the spindles and axle, and means for supplying power to the rear axle.

4. In mechanism of the class described, a load supporting body, front spindles and a rear axle, members connecting the front spindles and rear axle with the said body, the rear axle having its connecting member connected with the body at a point considerably forwardly of the rear end of the body. wheels mounted upon the spindles and axle, and auxiliary road engaging wheels carried by the body and located rearwardly of the rear wheels and normally spaced above the road surface.

5. In mechanism of the class described, a load supporting body, front spindles and a rear axle, members connecting the spindles and rear axle with the said body, the rear axle having its connecting member connected with the body at a point considerably forwardly of the rear end of the body, wheels mounted upon the spindles and axle, auxiliary road engaging wheels carried by the body and located rearwardly of the rear wheels and normally spaced above the road surface, and means for simultaneously angularly adjusting the forward and auxiliary wheels for steering the same.

6. In mechanism of the class described, a load supporting body, front spindles and a rear axle, wheels carried thereby, shafts mounted upon the body, operative connection between the shafts whereby rotation of one shaft will result in the rotation of the other, arms rigidly secured to the shafts and connected to the spindles and axle, the said arms being adapted to have their angles of inclination varied through rotation of the said shafts, and means operatively coacting with one of the shafts whereby the same may be rotated.

7. In mechanism of the class described, a load supporting body, front spindles and a rear axle, members connecting the spindles and rear axle with the said body, the rear axle having its connecting member connected with the body at a point considerably forwardly of the rear end of the body, wheels mounted upon the spindles and axle, auxiliary road engaging wheels carried by the body and located rearwardly of the rear wheels and normally spaced above the road surface, a swinging steering post, means for adjusting the front and rear wheels forwardly and rearwardly with relation to the body, and operative connection between the steering post above and below its swinging support and the said front and rear wheels.

8. In mechanism of the class described, a load supporting body, a shaft mounted for rotary adjustment upon the body at the front thereof, shafts mounted parallel to each other upon the said body forwardly of the rear end thereof, arms connected to the first mentioned shaft and to the forward one of the second mentioned shafts and extending downwardly and forwardly therefrom, wheels supported at the lower ends of the said arms, means for applying power to the rear set of wheels, arms extending downwardly and rearwardly from the rear one of the second mentioned shafts, wheels carried thereby, operative connection between the second mentioned shafts providing for rotation thereof in unison in opposite directions, means for rotatably adjusting the first mentioned shaft, and operative connection between the said first mentioned shaft and the forward one of the second mentioned shafts for adjusting the latter in unison with the former.

9. In mechanism of the class described, a load supporting body, a shaft mounted for rotary adjustment upon the body at the front thereof, shafts mounted parallel to each other upon the said body forwardly of the rear end thereof, arms connected to the first mentioned shaft and to the forward one of the second mentioned shafts and extending downwardly and forwardly therefrom, wheels supported at the lower ends of the said arms, means for applying power to the rear set of wheels, arms extending downwardly and rearwardly from the rear one of the second mentioned shafts, wheels carried thereby, operative connection between the second mentioned shafts providing for rotation thereof in unison in opposite directions, means for rotatably adjusting the first mentioned shaft, operative connection between the said first mentioned shaft and the forward one of the second mentioned shafts for adjusting the latter in unison with the former, the first and last mentioned wheels being mounted upon steering knuckles, a floating steering post, and operative connection between the said post and the knuckles of the two sets of wheels.

In testimony whereof I affix my signature.

PAMPHIL TESLUK. [L. S.]